(12) United States Patent
Williams et al.

(10) Patent No.: US 6,248,886 B1
(45) Date of Patent: *Jun. 19, 2001

(54) HETEROCYCLIC OXONOL INFRARED REDIATION SENSITIVE COMPOUNDS

(75) Inventors: Kevin W. Williams; Shiying Zheng, both of Rochester; Thap DoMinh, Webster, all of NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/589,965

(22) Filed: Jun. 8, 2000

Related U.S. Application Data

(63) Continuation-in-part of application No. 09/444,690, filed on Nov. 22, 1999.

(51) Int. Cl.[7] ............ C07D 265/32; C07D 241/04
(52) U.S. Cl. .......... 544/106; 544/389; 548/400; 548/469
(58) Field of Search ............... 544/389, 106; 548/400, 469

Primary Examiner—Richard L. Raymond
Assistant Examiner—Hong Liu
(74) Attorney, Agent, or Firm—J. Lanny Tucker

(57) ABSTRACT

Infrared radiation-sensitive heterocyclic oxonol compounds have been found that are represented by Structure DYE as follows:

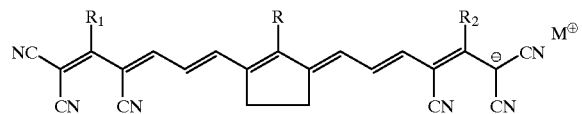

wherein R is a secondary or tertiary amine, $R_1$ and $R_2$ are independently heterocyclic or carbocyclic aromatic groups, and $M^+$ is a monovalent cation, provided that at least one of R, $R_1$ and $R_2$ contains at least one heterocyclic group. These compounds have a $\lambda_{max}$ above 700 nm and are can be used in a number of photosensitive or heat-sensitive imaging materials.

6 Claims, No Drawings

HETEROCYCLIC OXONOL INFRARED REDIATION SENSITIVE COMPOUNDS

RELATED APPLICATIONS

This application is a Continuation-in-part of U.S. Ser. No. 09/444,690 filed Nov. 22, 1999 by Williams, DoMinh and Zheng.

Another related application is commonly assigned U.S. Ser. No. 09/589,964 filed on even date herewith by Williams, DoMinh and Zheng, now abandoned and entitled "Non-Heterocyclic Oxonol Infrared Radiation Sensitive Compounds."

FIELD OF THE INVENTION

This invention relates to novel compounds that are infrared radiation sensitive. More particularly, this invention relates to novel heterocyclic oxonol compounds that are sensitive at 700 nm or higher wavelengths in water or water-miscible organic solvents.

BACKGROUND OF THE INVENTION

Particulate compounds that absorb at various wavelengths have been used in photographic silver halide materials for many years. For example, such compounds have been used as "filter" dyes to absorb electromagnetic radiation ("light") from different regions of the electromagnetic spectrum, such as red, blue, green, ultraviolet and infrared regions. These filter dyes are often required to perform the function of absorbing light during exposure of the material so as to prevent or at least inhibit light of a particular region of the spectrum from reaching at least one of the radiation-sensitive layers of the material.

Particulate filter dyes can be designed with various features to facilitate their use and/or immobilization in photographic materials, as described for example in U.S. Pat. No. 5,213,956 (Diehl et al).

There is a need in the photographic industry for compounds that absorb in the near infrared and infrared regions of the electromagnetic spectrum for various purposes. Such materials can be used, for example, to absorb heat and to initiate or facilitate imaging in lithographic printing plates. However, such compounds (that is, IR dye sensitizers) must be compatible with other components of imaging formulations used in such printing plates.

Organic dye salts, by nature, are often partially soluble in water or alcoholic coating solvents and are thus preferred as IR dye sensitizers in lithographic plate imaging compositions. However, many such salts have been found to be unacceptable because of insufficient solubility, because they react with the charged polymer to form hydrophobic products that can result in scummed or toned images, or because they offer insufficient thermal sensitization in imaging members. In particular, there is a need to have IR dye sensitizers that are compatible with thiosulfate polymers, such as those described in copending and commonly assigned U.S. Pat. No. 5,985,514.

SUMMARY OF THE INVENTION

We have discovered that certain heterocyclic oxonol compounds are useful as infrared radiation absorbing compounds in lithographic printing plates and other imaging elements describes herein. These novel compounds are soluble in water or water-miscible organic solvents, absorb radiation and have a $\lambda_{max}$ greater than 700 nm as measured in water or a water-miscible organic solvent. These compounds are also represented by Structure DYE shown as follows:

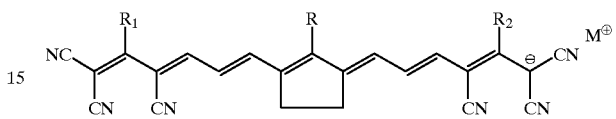

wherein R is a straight-chain or cyclic secondary or tertiary amine, $R_1$ and $R_2$ are independently heterocyclic or carbocyclic aromatic groups, and $M^+$ is a monovalent cation, provided that at least one of R, $R_1$ and $R_2$ contains at least one heterocyclic group.

These compounds have been found not only to have the desired infrared radiation absorption characteristics but also to be soluble in water or water-miscible organic solvents that are often used to formulate and coat lithographic printing plate imaging compositions. In addition, these compounds are compatible with negatively charged polymers that may be present in those compositions (for example, anionic polymers used for imaging such as those described in U.S. Pat. No. 5,985,514 noted above). In other words, no precipitates are formed when such compounds and polymers are mixed.

A preferred use of the compounds of this invention in printing plates is described in copending and commonly assigned U.S. Ser. No. 09/444,695 filed Nov. 22, 1999 by DoMinh et al.

The compounds can also be used as filter dyes that are compatible with components in color and black-and-white photographic silver halide layers, and that do not adversely affect the sensitometric properties of such layers. We have also found that the compounds have desirable raw stock keeping.

DETAILED DESCRIPTION OF THE INVENTION

The compounds of this invention are heterocyclic oxonol infrared radiation sensitive dyes ("IR dyes") that comprise a methine linkage conjugated with 2 cyclic or aliphatic groups, one of which is negatively charged, and containing at least one heterocyclic group. They are soluble in water or any of the water-miscible organic solvents that are commonly useful for preparing heatsensitive lithographic imaging compositions (for example, methanol, ethanol, isopropanol, 1-methoxy-2-propanol, methyl ethyl ketone, tetrahydrofuran, acetonitrile, butyrolactone and acetone). Preferably, the IR dyes are soluble in either water or methanol, or a mixture of water and methanol. Solubility in water or the water-miscible organic solvents means that the oxonol IR dye can be dissolved at a concentration of at least 0.5 g/l at room temperature.

The oxonol IR dyes are sensitive to radiation in the near-infrared and infrared regions of the electromagnetic spectrum. Thus, they generally have a $\lambda_{max}$ at or above 700 nm (preferably a $\lambda_{max}$ of from about 750 to about 900 nm, and more preferably a $\lambda_{max}$ of from about 800 to about 850 nm).

The oxonol IR dyes can be synthesized using general procedures described by Hamer in *The Cyanine Dyes and Related Compounds*, Interscience Publishers, 1964. A preferred synthetic method is described below.

The oxonol IR dyes of this invention can be represented by Structure DYE shown as follows:

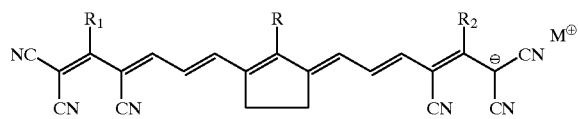

wherein R is a secondary or tertiary amine. The nitrogen atom of this amine group can be substituted, for example, with one or more substituted or unsubstituted alkyl groups having 1 to 20 carbon atoms (methyl, ethyl, isopropyl, t-butyl, hexyl, dodecyl, aminoethyl, methylsulfonaminoethyl and other groups readily apparent to one skilled in the art), substituted or unsubstituted aryl groups (such as phenyl, naphthyl, xylyl, m-carboxyphenyl and others than would be readily apparent to one skilled in the art), a=C(N<)— group, or substituted or unsubstituted heterocyclic groups having 3 to 8 carbon, oxygen, nitrogen and sulfur atoms in the ring structure (such as morpholino, pyridyl, pyrimidyl, thiomorpholino, pyrrolidinyl, piperazinyl and others that would be readily apparent to one skilled in the art). In addition, R can be

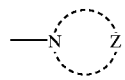

wherein Z represents the carbon, nitrogen, oxygen and sulfur atoms necessary to complete a substituted or unsubstituted 5- to 9-membered heterocyclic ring (such as morpholino, thiomorpholino, piperidinyl and piperazinyl).

Preferably, R is a secondary amine having at least one phenyl substituent, a substituted or unsubstituted alkyl group having 1 to 3 carbon atoms, or R is

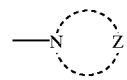

wherein Z represents the carbon, nitrogen and oxygen atoms necessary to complete a substituted or unsubstituted 5- to 9-membered heterocyclic group. Most preferably, Z represents the carbon, nitrogen and oxygen atoms necessary to complete a substituted or unsubstituted morpholino, thiomorpholino or piperazinyl group.

$R_1$ and $R_2$ are independently substituted or unsubstituted heterocyclic or carbocyclic aromatic groups having from 5 to 12 atoms in the aromatic ring. Preferably, $R_1$ and $R_2$ represent the same aromatic group. Useful aromatic groups include, but are not limited to, substituted or unsubstituted phenyl groups, substituted or unsubstituted naphthyl groups and substituted or unsubstituted furanyl groups, substituted or unsubstituted thiophenyl groups, and substituted or unsubstituted benzofuranyl groups. These aromatic groups can be substituted with one or more amino, methoxy, carboxy, sulfo, sulfonamido or alkylsulfonyl groups. Preferably, when $R_1$ and $R_2$ are substituted, they each have one or more of the same substituents.

At least one of R, $R_1$ and $R_2$ comprises at least one heterocyclic group, particularly a nitrogen- or oxygen-containing heterocyclic group.

$M^+$ is a suitable monovalent cation such as an alkali metal ion (lithium, sodium or potassium), an ammonium ion, a trialkylammonium ion (such as trimethylammonium, triethyleammonium or tributylammonium ions), a tetraalkylammonium ion (such as tetramethylammonium ion), pyridinium ion or tetramethyl guanidinium ion.

Examples of oxonol IR dyes of this invention include, but are not limited to, the following compounds:

DYE 1

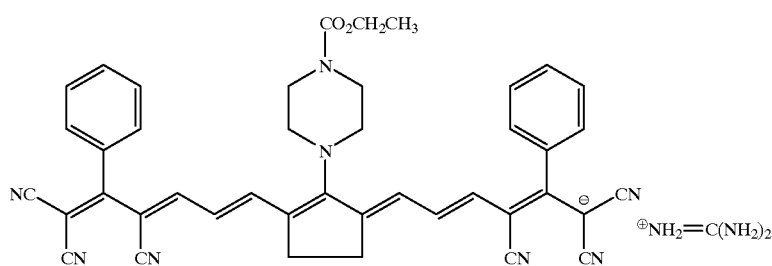

DYE 2

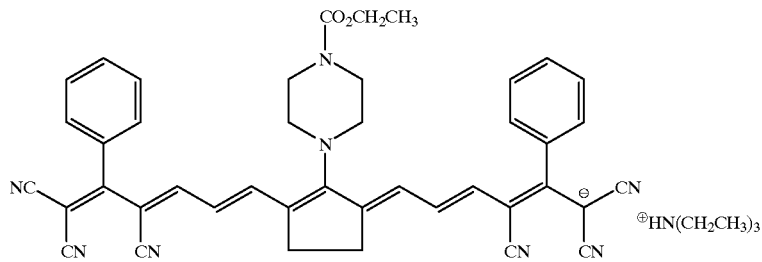

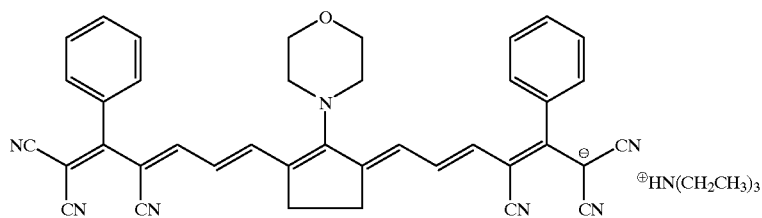
DYE 3
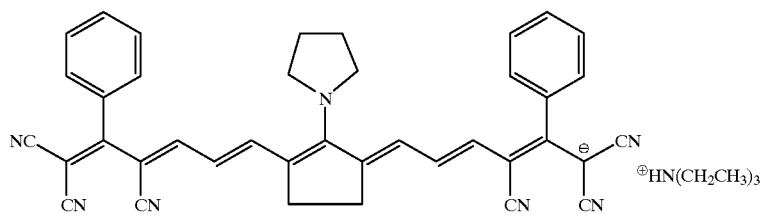
DYE 4
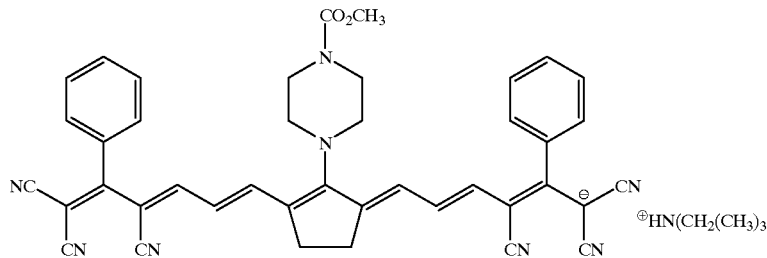
DYE 5
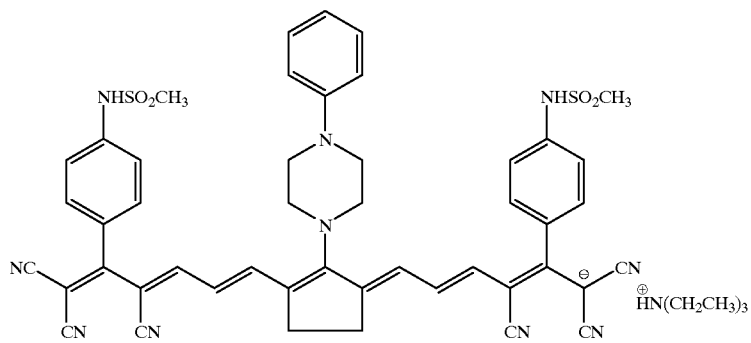
DYE 6
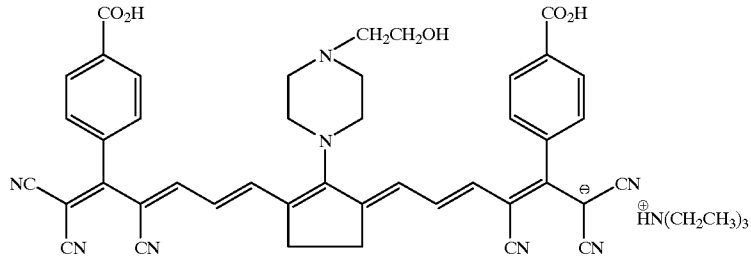
DYE 7
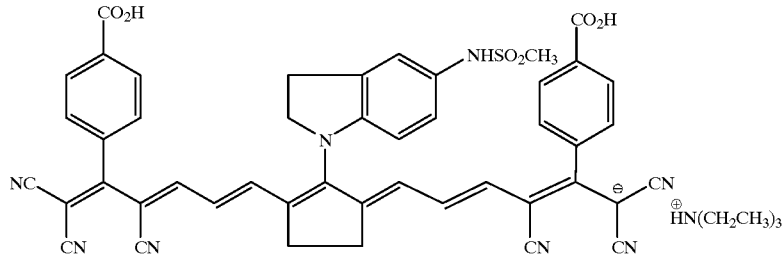
DYE 8

-continued
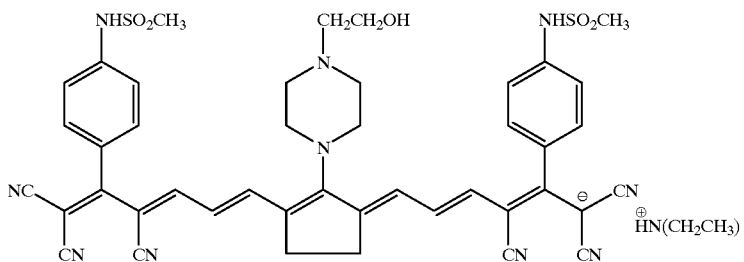
DYE 9
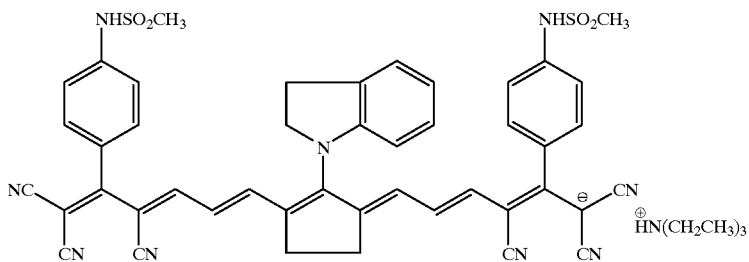
DYE 10
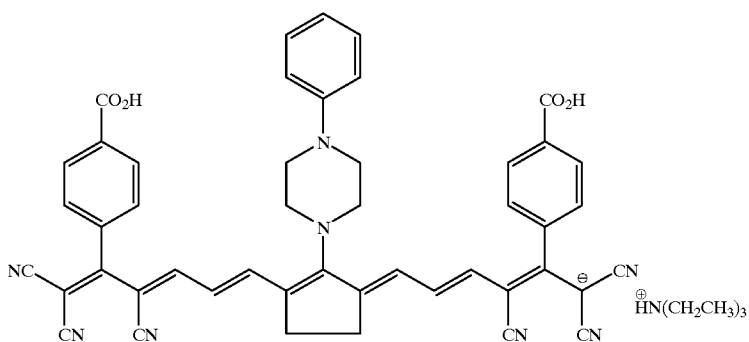
DYE 11
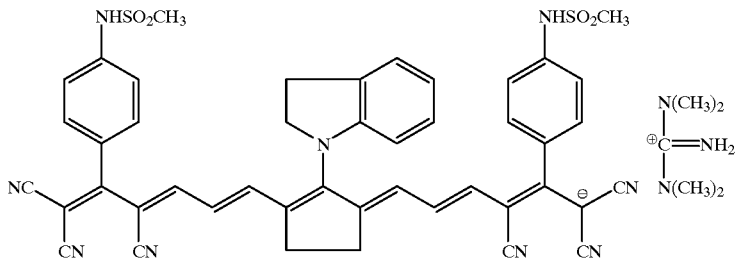
DYE 12
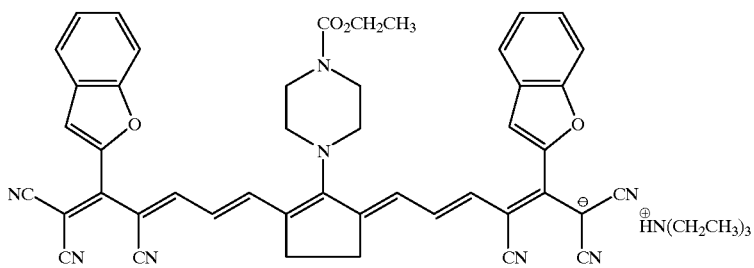
DYE 13

Further oxonol IR dyes are defined in reference to Structure DYE wherein $R_1$ and $R_2$ are each a phenyl group, as follows:

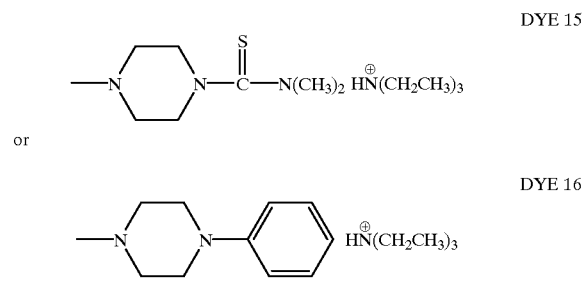

DYE 15 or

DYE 16

Oxonol IR Dye 3 was prepared using the following synthetic scheme that is generally useful for all of the compounds of this invention.

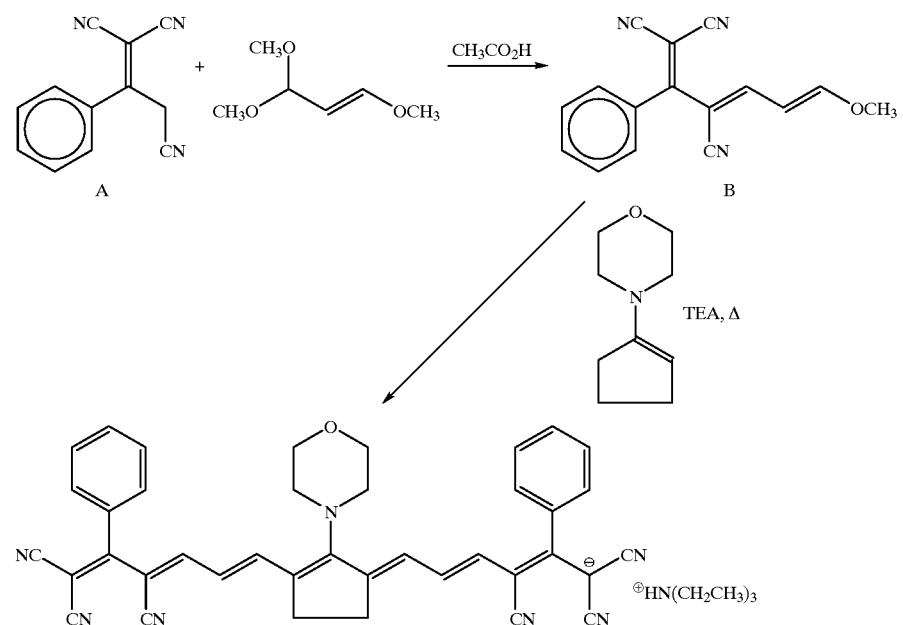

A sample of intermediate A (15 g, 0.077 moles) and trimethoxypropene (26.5 g, 0.2 moles) were added together to a 200 ml beaker containing acetic acid (60 ml). The solution was stirred mechanically using a overhead stirrer at room temperature. The suspension dissolved and as the solution was warmed slightly, it became green in color. As soon as the solution was homogeneous, a yellow solid began to precipitate from the solution. The reaction mixture was stirred an additional 2 hours before the yellow solid was collected by filtration. The solid was rinsed with acetic acid (120 ml) and dried in a vacuum oven at 50° C. for 16 hours. The result was 17.5 g of solid intermediate B at 87% yield. NMR (300 Mhz, CDC13) dtms 7.5 (m, 4H), 7.3 (m, 2H), 6.25 (m, 2H).

A sample of intermediate B (15 g, 0.57 moles) was heated to boiling in acetonitrile (50 ml) in a 250-ml beaker on a hot plate. The reaction mixture was stirred mechanically and 4-(1-cyclopentenyl-1-yl)morpholine (Aldrich Chemical Co., 4.4 g, 0.28 moles) was added. Triethylamine (9.5 ml) was added to the solution and it immediately turned purple in color and then eventually green in color. The reaction mixture was heated an additional 15 minutes and then filtered while hot through a sintered glass funnel. A filtrate set up in the filter funnel and acetonitrile (50 ml) and water (10 ml) were added. The solution was again heated to boiling at which time the solids had dissolved. After 15 minutes, the solution was allowed to cool with stirring at room temperature. A solid precipitate formed that was collected by filtration. It was recrystallized from acetonitrile (90 ml) and water (10 ml). A green solid was collected and dried to give 10.6 g of IR Dye 3 at 50% yield. HPLC showed that the material was 99% pure. $\lambda_{max}$=815 nm($CH_3OH$), e=13.7×10$^4$.

The following examples illustrate a preferred utility for the compounds of this invention.

USE EXAMPLE 1

An imaging formulation was prepared using the components (parts by weight) shown in TABLE I below.

TABLE I

| Component | Formulation |
| --- | --- |
| Heat sensitive polymer | 0.30 |
| Oxonol IR Dye 1 | 0.03 |
| Water | 4.14 |
| Acetone | 4.50 |

The formulation was coated at a dry coating weight of about 1.0 g/m$^2$ onto a grained phosphoric acid-anodized aluminum support. The resulting printing plate was dried in a convection oven at 82° C. for 3 minutes. The imaging layer of the printing plate was imaged at 830 nm on a plate setter using doses ranging from 360 to 820 mJ/cm$^2$. The blue imaging layer produced a deep blue image.

The imaged plate was mounted on the plate cylinder of a commercially available full-page printing press (A. B. Dick 9870 duplicator) for a press run. A commercial black ink and Varn Universal Pink fountain solution (from Varn Products Co.) were used. The plate developed on press within 60 seconds of the press run. The on-press processed plates rolled up after 10 sheets and printed with full density and high image quality for at least 1,000 impressions. The printing plate comprising oxonol IR dye 1 (at a 10:1 polymer:IR dye weight ratio and at 50% loading) required only 250 mJ/cm² of laser energy.

The heat-sensitive polymer poly(vinyl benzyl thiosulfate sodium salt-co-methyl methacrylate) shown in TABLE I was prepared as follows:

Vinyl benzyl chloride (10 g, 0.066 mol), methyl methacrylate (15.35 g, 0.153 mol) and AIBN (0.72 g, 4 mmol) were dissolved 120 ml of toluene. The solution was purged with dry nitrogen and then heated at 65° C. overnight. After cooling to room temperature, the solution was dropwise added to 1200 ml of isopropanol. The resulting white powdery polymer was collected by filtration and dried under vacuum at 60° C. overnight. ¹H NMR analysis indicate that the copolymer contained 44 mol % of vinyl benzyl chloride.

This polymer (16 g) was dissolved in 110 m of N,N'-dimethylformamide. To this solution was added sodium thiosulfate (12 g) and water (20 ml). Some polymer precipitated out. The cloudy reaction mixture was heated at 90° C. for 24 hours. After cooling to room temperature, the hazy reaction mixture was dialyzed against water. A small amount of the resulting polymer solution was freeze dried for elemental analysis and the rest of the polymer solution was subject to imaging testing. Elemental analysis indicated that all the vinyl benzyl chloride was converted to sodium thiosulfate salt.

USE EXAMPLES 2–5
Printing Plates Containing Other Oxonol IR Dyes

The following printing plates were prepared and used in printing as described above in Use Example 1. The imaging layers in the printing plates contained the oxonol IR dyes in TABLE II below. Each printing plate was successfully imaged and used to produce 1,000 printed sheets of good quality on the A.B. Dick press.

TABLE 3

| Example | IR Dye | Substituent R group in Structure DYE | $\lambda_{max}$ (nm) | $OD_{830}$ | Photospeed (mJ/cm²) | Cation[a] (M⁺) |
|---|---|---|---|---|---|---|
| 2 | 1 | —N(piperazine)N—CO₂Et | 850 | 0.75 | <360 | TMG⁺ |
| 3 | 2 | —N(piperazine)N—CO₂Et | 850 | 0.85 | <360 | TEA⁺ |
| 4 | 3 | —N(morpholine)O | 850 | 0.78 | <360 | TEA⁺ |
| 5 | 4 | —N(pyrrolidine) | 760 | 0.45 | 450 | TEA⁺ |

[a]TMG⁺: tetramethylguanidinium ion, TEA⁺: triethylamonium ion

The invention has been described in detail with particular reference to preferred embodiments thereof, but it will be understood that variations and modifications can be effected within the spirit and scope of the invention.

We claim:

1. A compound that absorbs radiation and has a $\lambda_{max}$ greater than 700 nm as measured in water or a water-miscible organic solvent, and represented by the Structure DYE as follows:

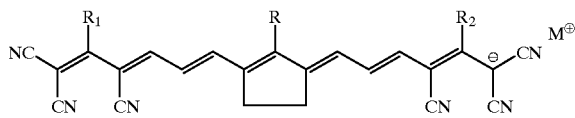

wherein R is a

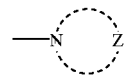

group wherein Z represents the carbon, nitrogen, and oxygen atoms necessary to complete a substituted or unsubstituted 5- to 9-membered heterocyclic ring, $R_1$ and $R_2$ are the same heterocyclic or carbocyclic aromatic groups having from 5 to 12 atoms in the aromatic ring, and M⁺ is a monovalent cation.

2. The compound of claim 1 having a $\lambda_{max}$ of from about 750 to about 900 nm as measured in water or said water-miscible organic solvent.

3. The compound of claim 2 having a $\lambda_{max}$ of from about 800 to about 850 nm as measured in water or said water-miscible organic solvent.

4. The compound of claim 1 wherein R further comprises at least one phenyl substituent, or an alkyl group having 1 to 3 carbon atoms, and $R_1$ and $R_2$ are the same substituted or unsubstituted phenyl or benzofuranyl group.

5. The compound of claim 1 that is
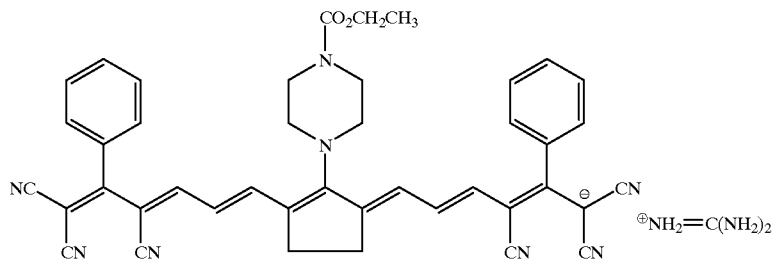
DYE 1
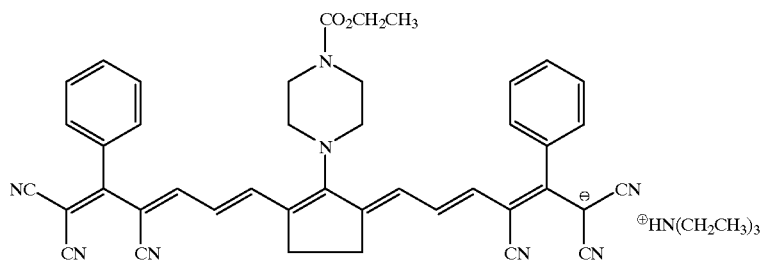
DYE 2
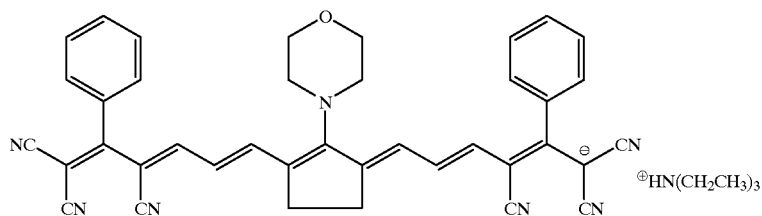
DYE 3
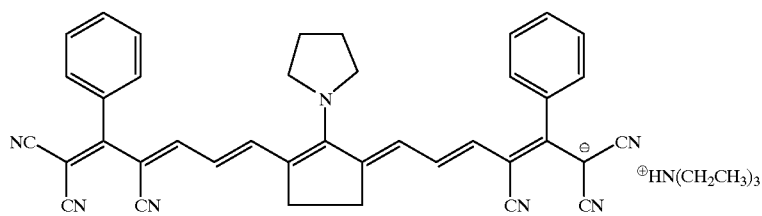
DYE 4
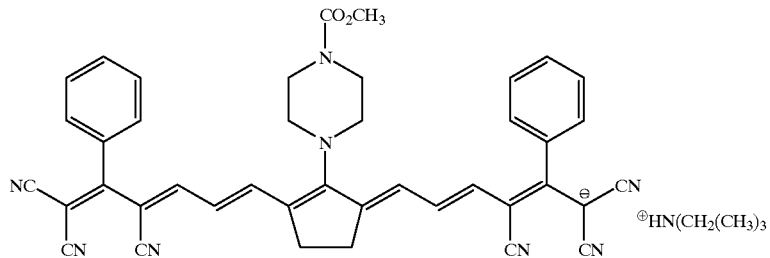
DYE 5

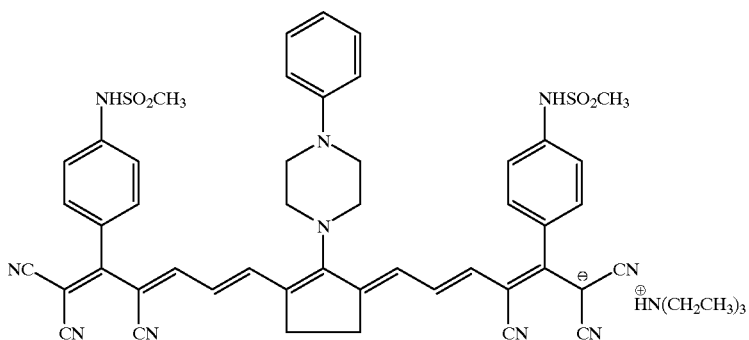
DYE 6
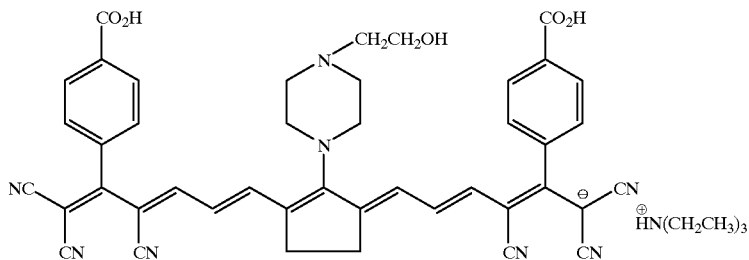
DYE 7
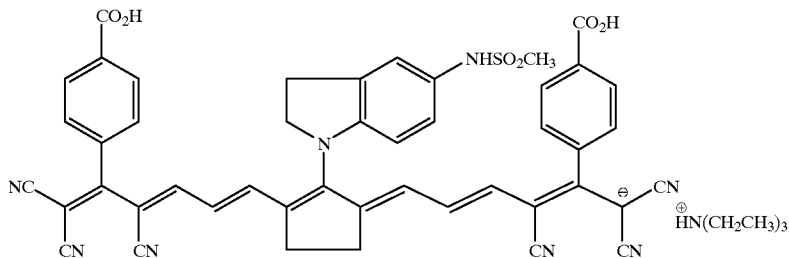
DYE 8
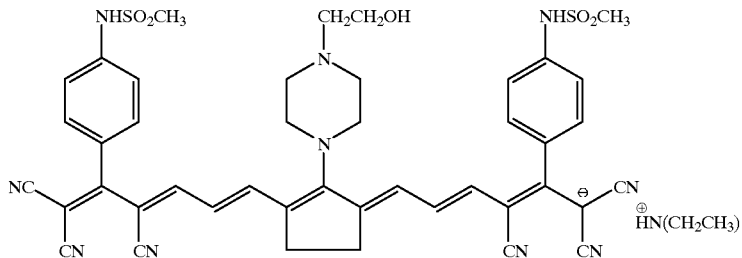
DYE 9
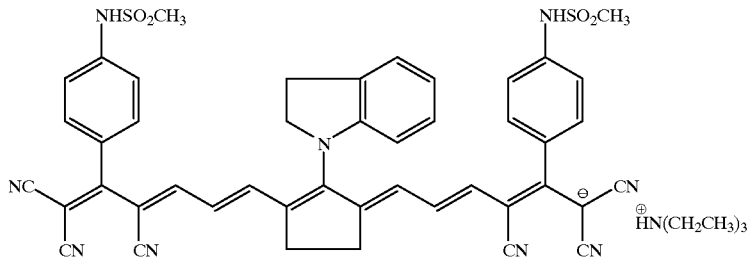
DYE 10

-continued
DYE 11
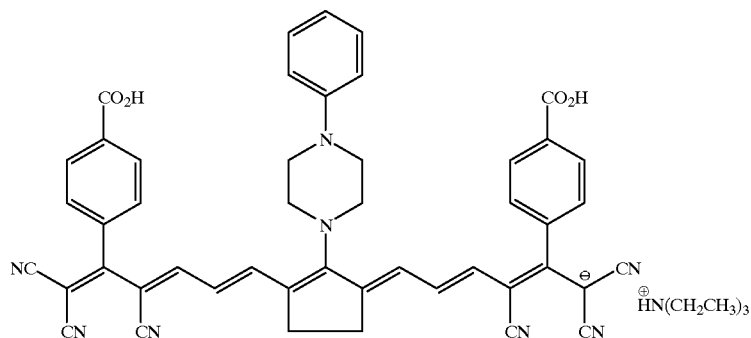
DYE 12
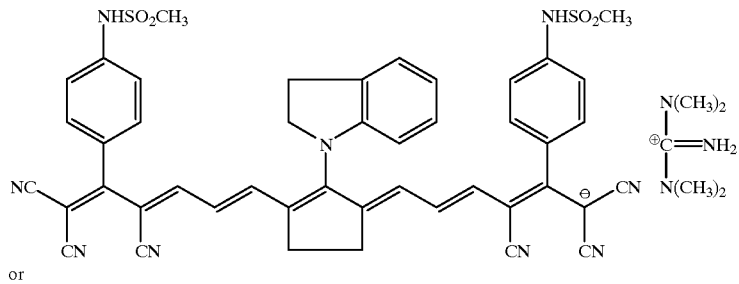
or
DYE 13
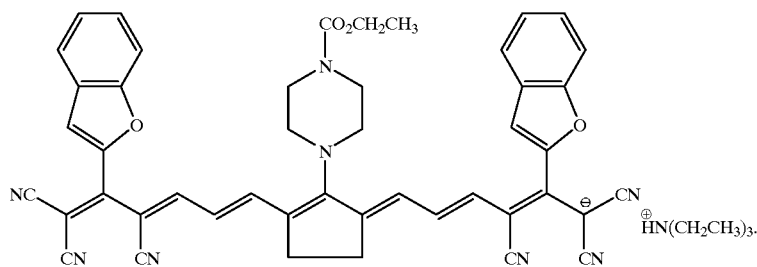
6. The compound of claim 1 wherein, in reference to Structure DYE, $R_1$ and $R_2$ are each a phenyl group and the IR Dye is:
| IR Dye | R | M⁺ |
|---|---|---|
| DYE 15 | —⟨N-piperazinyl⟩—C(=S)—N(CH₃)₂ | $HN(CH_2CH_3)_3^+$ |
| IR Dye | R | M⁺ |
|---|---|---|
| or | | |
| DYE 16 | 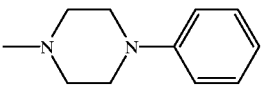 | $HN(CH_2CH_3)_3^+$ |
* * * * *